(12) United States Patent
Wollum et al.

(10) Patent No.: US 6,362,283 B1
(45) Date of Patent: Mar. 26, 2002

(54) BLOCK COPOLYMERS INTERPOLYMERIZED WITH IN SITU POLYSTYRENE AND PROCESS FOR PREPARATION THEREOF

(75) Inventors: Mark H. Wollum, Norton; Daniel F. Graves, Canal Fulton, both of OH (US)

(73) Assignee: Firestone Polymers LLC, Akron, OH (US)

( * ) Notice: Subject to any disclaimer, the term of this patent is extended or adjusted under 35 U.S.C. 154(b) by 0 days.

(21) Appl. No.: 09/676,239

(22) Filed: Sep. 29, 2000

Related U.S. Application Data

(63) Continuation of application No. 08/935,773, filed on Sep. 23, 1997, which is a continuation-in-part of application No. 08/334,989, filed on Nov. 7, 1994, now abandoned.

(51) Int. Cl.[7] ............................................. C08F 255/06
(52) U.S. Cl. ..................................... 525/316; 525/191
(58) Field of Search ................................ 525/316, 191

(56) References Cited

U.S. PATENT DOCUMENTS

| | | | |
|---|---|---|---|
| 3,030,346 A | 4/1962 | Cooper, Jr. | 260/83.7 |
| 3,149,182 A | 9/1964 | Porter | 260/879 |
| 3,231,635 A | 1/1966 | Holden et al. | 260/880 |
| 3,239,478 A | 3/1966 | Harlan, Jr. | 260/27 |
| 3,265,765 A | 8/1966 | Holden et al. | 260/876 |
| 3,560,593 A | 2/1971 | Hsieh | 260/880 |
| 3,700,748 A | 10/1972 | Winkler | 260/879 |
| 3,728,300 A | 4/1973 | Minekawa et al. | 260/33.6 AQ |
| 3,792,005 A | 2/1974 | Harlan, Jr. | 260/27 BB |
| 3,806,557 A | 4/1974 | Halasa | 260/880 R |
| 3,819,764 A | 6/1974 | Halasa | 260/877 |
| 3,823,203 A | 7/1974 | De La Mare | 260/876 B |
| 3,896,068 A | 7/1975 | Walker | 260/28.5 B |
| 3,954,696 A | 5/1976 | Roest et al. | 260/880 B |
| 4,086,298 A | 4/1978 | Fahrbach et al. | 260/880 B |
| 4,153,647 A | 5/1979 | Glukhovskoi et al. | 260/880 R |
| 4,163,764 A | 8/1979 | Nash | 525/2 |
| 4,248,981 A | 2/1981 | Milkovich et al. | 525/271 |
| 4,248,982 A | 2/1981 | Bi et al. | 525/271 |
| 4,248,983 A | 2/1981 | Bi et al. | 525/314 |
| 4,248,984 A | 2/1981 | Bi et al. | 525/314 |
| 4,308,358 A | 12/1981 | Miller | 525/267 |
| 4,309,515 A | 1/1982 | Corley | 525/316 |
| 4,335,221 A | 6/1982 | Gerberding | 525/89 |
| 4,377,665 A | 3/1983 | Shiraki et al. | 525/250 |
| 4,442,058 A | 4/1984 | Griffith et al. | 264/176 R |
| 4,584,346 A | 4/1986 | Kitchen | 525/98 |
| 4,639,494 A | 1/1987 | Imai et al. | 525/271 |
| 5,130,377 A | 7/1992 | Trepka et al. | 525/314 |
| 5,272,207 A | 12/1993 | Hall et al. | 525/89 |
| 5,633,318 A * | 5/1997 | Bowen | 525/71 |
| 5,795,938 A | 8/1998 | Knoll et al. | 525/98 |

* cited by examiner

*Primary Examiner*—Edward J. Cain
(74) *Attorney, Agent, or Firm*—David G. Burleson; Rodney Skoglund

(57) ABSTRACT

A process for interpolymerizing a vinyl aromatic hydrocarbon polymer and a block polymer is disclosed. The process includes the following steps: (a) forming a block polymer precursor of at least one polymeric block containing conjugated diene monomer contributed units in the presence of an anionic initiator and in an inert diluent, the block polymer precursor having living ends; and (b) thereafter adding to the block polymer precursor a charge of a vinyl aromatic hydrocarbon monomer and an additional charge of an anionic initiator to simultaneously form (1) a block polymer having a terminal block formed from the charge of vinyl aromatic hydrocarbon monomer attached to the block polymer precursor and (2) a poly(vinyl aromatic hydrocarbon) polymer interpolymerized with the block polymer. The practice of this process produces a vinyl aromatic hydrocarbon block terminated block polymer, such as SBS, interpolymerized with a polymer formed from vinyl aromatic hydrocarbon monomer, such as polystyrene. The resultant interpolymer has a high Gardner Impact Strength and good processability.

8 Claims, 1 Drawing Sheet

US 6,362,283 B1

BLOCK COPOLYMERS INTERPOLYMERIZED WITH IN SITU POLYSTYRENE AND PROCESS FOR PREPARATION THEREOF

RELATED APPLICATION DATA

This application is a Continuation of application Ser. No. 08/935,773, filed Sep. 23, 1997, which is a Continuation-in-part of application Ser. No. 08/334,989, filed Nov. 7, 1994, now abandoned.

FIELD OF THE INVENTION

This invention relates generally to processes for incorporating polystyrene in block copolymers and to the compositions produced thereby. More specifically, the invention relates to a process for producing a vinyl aromatic hydrocarbon block terminated block polymer, such as SBS, inter-polymerized with a polymer formed from vinyl aromatic hydrocarbon monomer contributed unites, such as polystyrene; and a product having a substantially improved Gardner impact strength, produced by such a process.

BACKGROUND OF THE INVENTION

The prior art has long strived to improve the physical properties of styrenic polymers. For instance, U.S. Pat. No. 4,267,283 to Whitehead teaches a two-component graft copolymer composition having improved toughness. The first graft polymer component is disclosed as consisting essentially of: from about 8.0 to about 16.0 parts by weight of a mixture of an ABA block copolymer and an A'B'A' tapered block copolymer in a weight ratio of the ABA copolymer to the A'B'A' copolymer of between about 25:75 and about 75:25. Each A segment is an essentially pure polymer block of styrene having a number average molecular weight of between about 14,000 and about 18,000. Each B segment is an essentially pure polymer block of butadiene having a number average molecular weight of between about 60,000 and about 80,000; the B block having a glass transition temperature of about $-105°$ C.$+/-5°$ C. The weight ratio of total A to B being between about 1:1.8 and about 1:2.7. Each A' segment represents essentially polymerized styrene. The balance of the A' segment is polymerized butadiene. The B' segment represents essentially polymerized butadiene. The balance of the B' segment is polymerized styrene. The weight ratio of total A' to B' being from about 1:2.6 to about 1:3.6, the number average molecular weight of said A'B'A' block copolymers being between about 400,000 and about 660,000. The B' block has a glass transition temperature of about $-90°$ C.$+/-5°$ C. The second graft component consist essentially of from about 92.0 to about 84.0 parts by weight of monomeric styrene polymerized in the presence of the ABA and A'B'A' copolymers.

Similarly, U.S. Pat. No. 3,954,696 to Roest, teaches a process for the preparation of block copolymers of the general formula A—B—C. This process includes the steps of polymerizing at least one monomer to form a living polymer block A; adding a further monomer and continuing polymerization to form polymer block B bound to polymer block A, and continuing polymerization while adding at least one monomer to form terminal polymer block C, so as to produce an A—B—C block copolymer. Each of the polymer blocks A and C consist of either a non-elastomer homopolymer or copolymer having a glass transition temperature over 25° C. And a number average molecular weight between 200 and 100,000. The polymer block B consists of a conjugated diene, derived from preferably 1,3-butadiene or isoprene, having a glass transition temperature below $-10°$ C. and a number average molecular weight between 25,000 and 1,000,000. The contaminants contained in the monomers forming blocks A and C are thereafter deactivated. As his improvement over the prior are, Roest includes contaminants in the conjugated diene monomer forming polymer bock B, that have not been deactivated and that are capable of killing 1–50% of the living polymer block A upon introduction of conjugated diene monomer to the reaction mass. Each of the polymer blocks A and C are disclosed as consisting of a non-elastomeric polymer block having a glass transition point over 50° C. and a number average molecular weight between 500 and 50,000. The polymer block B is disclosed as consisting of an elastomeric polymer block having a glass transition point below $-25°$ C. and a number average molecular weight between 50,000 and 500,000. At least one of polymer blocks A and C is derived from a monovinyl aromatic hydrocarbon.

U.S. Pat. No. 3,265,765 to Holden et al, discloses an unvulcanized elastomeric block copolymer having the general configuration A—B—A. Holden discloses that block A is an independently selected non-elastomeric monovinyl aromatic hydrocarbon polymer block having an average molecular weight of 2,000–100,000 and a glass transition temperature above about 25° C. The total block A content being 10–50% by weight of the copolymer. Block B is an elastomeric conjugated diene polymer block having an average molecular weight between about 25,000 and 1,000,000 and a glass transition temperature below about 10° C. The copolymer is prepared with a lithium-based catalyst and has a tensile strength at 23° C., in excess of about 1400 pounds per square inch.

In yet another similar U.S. Pat. No. 3,231,635 to Holden et al., an unvulcanized elastomeric block copolymer having the general configuration A—B—A is disclosed. Block A is an independently selected non-elastomeric monovinyl aromatic hydrocarbon polymer block having an average molecular weight of 2,000–100,000 and a glass transition temperature above about 25° C. The total block A content being 10–50% by weight of the copolymer. Block B is an elastomeric conjugated diene polymer block having an average molecular weight between about 25,000 and 1,000,000 and a glass transition temperature below about 10° C. The copolymer is prepared with a lithium-based catalyst and has a tensile strength at 23° C., in excess of about 1400 pounds per square inch.

U.S. Pat. No. 3,239,478 to Harlan, teaches an adhesive composition that comprises components. The first component of the composition comprises 100 parts by weight of a block copolymer having the general configuration A—B—A. Each A block is an independently selected polymer block of a vinyl arene. The average molecular weight of each A block is between about 5,000 and about 125,000. The B block is a polymer block of a conjugated diene. The average molecular weight of the B block is between about 15,000 and about 250,000. The total of the A blocks is less than about 80% by weight of the copolymer. The second component of the composition comprises about 25–300 parts by weight of a tackifying resin. Finally, the third component of the composition comprises 5–200 parts by weight of an extender oil. The oil is substantially compatible with homopolymers of the conjugated diene.

Finally, U.S. Pat. No. 3,149,182 to Porter teaches a process for preparing an elastomeric three component block copolymer. The copolymer comprises the first step of: contacting a monomer of the group consisting of diolefins containing from 4 to 10 carbon atoms, mono alkenyl-substituted aromatic hydrocarbons and mono-alkenyl-substituted pryidine compounds with a hydrocarbon lithium compound in an inert atmosphere and under substantially anhydrous conditions until the unpolymerized monomer in the reaction mixture is consumed. Next, without further treating the reaction, adding a monomer of the above group which is similar to that used in the initial reaction. Thereafter, continuing the polymerization under the above conditions until the dissimilar monomer has been polymerized. Next, without further treatment of the reaction mixture, adding a third monomer which is different from the aforementioned dissimilar monomer and selected from the above group of monomers. Finally, the polymerization is continued under the aforedescribed conditions until the third monomer has been completely consumed. At least one of the foregoing monomers is a diolefin.

Despite the foregoing prior art, there nonetheless exists a long felt need for a process for predicably producing styrenic polymers exhibiting high Gardner impact strengths in excess of at least 60 fl lb/in, as well as such other polymers and articles produce therefrom.

Surprisingly, the instant inventors have discovered that by merely manipulating the weight proportions of the respective polymers of the interpolymer mix, dramatic increases in the Gardner Impact Strength of the product may be achieved.

Polystyrene is a well-known thermoplastic material finding a wide variety of uses. It is often added to polymers including block copolymers to increase the mold flow characteristic of the polymer, thus preventing the polymer from sticking to the injection molder cavity. Heretofore, polystyrene has been blended with block copolymers to increase the processability of the block copolymer. U.S. Pat. No. 4,308, 358 to Miller, discloses a process for making high impact polystyrene comprising mixing, at an elevated temperature, an AB block copolymer and a styrene polymer. This blending process creates disadvantageous properties in the blend, namely the impact strength of the block copolymer is severely reduced upon the addition of as low as 1.5% by weight of crystal polystyrene to the block copolymer. While not wishing to be bound by any particular theory, Applicants believe that the lower impact strength resulting from the blending of polystyrene and block copolymer is due to the different molecular weights and physical properties of the components thereby causing phase separation to occur in the resulting product. The poor interphase adhesion characteristic of highly incompatible blends usually results in very poor mechanical properties, e.g., tensile strength, elongation and impact strength.

It is therefore an object of the present invention to provide a process for producing an interpolymer of polystyrene and a block copolymer exhibiting good mechanical properties. It is a further object of this invention to provide polystyrene and block copolymer products exhibiting high impact strength.

SUMMARY OF INVENTION

In contrast to the foregoing prior art, the instant invention provides a process for interpolymerizing a blend of a vinyl aromatic hydrocarbon polymer and copolymer product is disclosed. The process includes the following steps:

(a) forming in a suitable diluent a block polymer precursor having a living end and having at least one polymeric block containing conjugated diene monomer contributed units in the presence of an anionic initiator;

(b) thereafter adding to the block polymer precursor a charge of vinyl aromatic hydrocarbon monomer and an additional amount of anionic initiator to simultaneously form (1) a block polymer having a terminal block, formed from the vinyl aromatic hydrocarbon monomer, attached to the block polymer precursor and (2) poly (vinyl aromatic hydrocarbon) interpolymerized with the block polymer of (1).

The practice of this process produces a vinyl aromatic hydrocarbon block terminated block polymer, such as SBS, interpolymerized with a polymer formed from vinyl aromatic hydrocarbon monomer contributed units, such as polystyrene.

Surprisingly, the instant inventors have discovered that by merely manipulating the weight proportions of the respective block polymer and polyvinyl aromatic hydrocarbon polymer of the interpolymer mix, dramatic increases of in excess of about 60 ft lb/in to at least about 200 ft lb/in of the Gardner Impact Strength of the final product may be achieved.

DETAILED DESCRIPTION OF THE PREFERRED EMBODIMENTS

Figure 1:
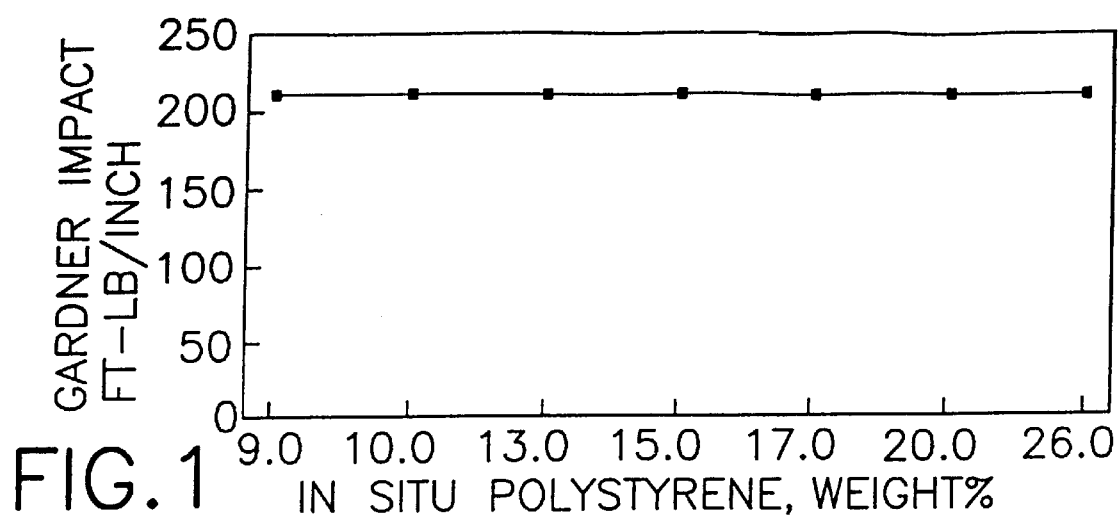
FIG. 1 illustrates the relationship between the Gardner Impact Strength (measured in ft-lb/inch) of interpolymers containing polystyrene and a block polymer as prepared in Example 1 and the percent by weight of in situ polystyrene formed from the total styrene monomer charge used to prepare the terminal polystyrene block and in situ polystyrene during formation of the interpolymer. The interpolymers represented in this figure were produced using the in situ process of the present invention.

The process of the present invention prepares an interpolymer of (1) a block polymer having a precursor polymer block attached to a terminal block of a poly(vinyl aromatic hydrocarbon) and (2) a poly (vinyl aromatic hydrocarbon). The precursor polymer block of the block polymer preferably contains diene monomer contributed block units, and optionally contains vinyl aromatic monomer (VAM) contributed units including random blocks of butadiene and styrene (B/S).

The block polymers to be interpolymerized in accordance with the present invention preferably contain conjugated diene monomers and vinyl substituted aromatic hydrocarbons contributed units. Polymerizable 1,3-diene monomers that can be employed in the production of the copolymers of the present invention are one or more 1,3-conjugated dienes containing from four to twelve, inclusive, carbon atoms per molecule. Exemplary monomers include 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3 butyl1-1,3-octadiene; and the like. Among the dialkyl-1,3-butadienes, it is preferred that the alkyl groups contain from one to three carbon atoms. The preferred 1,3-diene monomer for use in the process of the present invention is 1,3-butadiene.

Exemplary vinyl substituted aromatic hydrocarbon monomers, commonly referred to as vinyl aromatic hydrocarbon monomers or VAM, for use in either the preparation the block polymer precursor and/or the terminal block and the poly(vinyl aromatic hydrocarbon), include: styrene, alpha-methylstyrene; 1-vinylnaphthalene; 2-vinylnaphthalene; 1-alpha-methylvinylnaphthalene; 2-alphamethyl-vinylnaphthalene; and mixtures of these as well as alkyl, cycloalkyl, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-para-tolylstyrene; and 4,5-dimethyl-1-vinyinaphthalene. Occasionally, di-and tri-vinyl aromatic hydrocarbons are used in small amounts in addition with mono-vinyl aromatic hydrocarbons. The preferred vinyl aromatic hydrocarbon is styrene.

The total amount of vinyl aromatic hydrocarbon monomer in the final monomer charge used to prepare both the terminal vinyl aromatic block and the interpolymerized poly(vinyl aromatic hydrocarbon) is an amount of from 6.3 to 70.2% by weight, preferably from 28.3 to 61.7% by weight, more preferably from 50.6 to 57.6% by weight, based on the total weight of the block polymer. The weight percent of interpolymerized vinyl aromatic hydrocarbon polymer of the total amount of both of the terminal poly(vinyl aromatic hydrocarbon) block and vinyl aromatic hydrocarbon polymer is in the range of from 5 to 35% by weight, preferably from 9 to 26% by weight, more preferably from 10 to 20% by weight. These weight percentages reflect the percentage of monomer, such as styrene, of the final monomer charge that is polymerized due to the additional charge of anionic initiator to the reaction zone. The final monomer charge is used to prepare both the terminal block added onto the block polymer precursor and the interpolymerized poly(vinyl aromatic monomer).

The block polymers produced according to the instant invention must terminate in a vinyl aromatic hydrocarbon block. The resulting structure of the block polymers may be linear, branched, tapered, or star as long as the structure has a live end. Exemplary block precursors include block polymers containing at least one polymeric block, a diblock polymer, triblock polymers and tetrablock polymers, random copolymer blocks, graft-copolymers blocks, block-copolymers of a conjugated diolefin and a vinyl aromatic hydrocarbon, and mixtures thereof. Typical examples of the various structures of the block polymer precursors useful in the present invention are as follows:

(B—S)$_n$— linear,
S—(B—S)$_n$— linear,
B—(S—B)$_n$— linear,
B/S—B—S— linear,
[B(S)—B—B(S)—B—B(S)—B—B]$_n$— branched,
B—, S—B—, S—(B—S)$_n$—B—, (B—S)$_n$—B—, (B/S)$_n$—
B—, B—B/S)$_n$—, S—(B/S)$_n$—, and (B/S)$_n$—; wherein S is a polymer block primarily containing vinyl aromatic hydrocarbon monomer contributed units, B is a polymer block primarily containing conjugated diene monomer contributed units, and n is an integer of one or more. The rubbery diene portion of the polymer may contain some copolymer vinyl aromatic hydrocarbon in order to adjust the glass transition temperature ($T_g$) or the solubility parameter. The block polymers produced in accordance with the present invention are represented by any of the above-discussed block polymer precursor structures additionally containing a terminal block formed from vinyl aromatic hydrocarbon contributed units.

The process according to the present invention is performed in the following manner. First, any desirable block polymer precursor is prepared in a reactor or reaction zone by polymerizing suitable monomers, particularly diene monomers and/or vinyl aromatic monomers, to form one or more blocks in a suitable diluent in the presence of an anionic initiator. The resulting block polymer precursor is "living", because catalytically active anion is present at the terminal end of the block polymer precursor. The anion is capable of initiating polymerization of further monomers in the reaction zone.

After formation of the block polymer precursor, charges of additional anionic initiator and vinyl aromatic hydrocarbon monomer are simultaneously or sequentially added to the reaction zone containing the "living" block polymer precursor. A portion of the vinyl aromatic hydrocarbon monomer charge attaches to the "living" block polymer precursor. The additional charge of anionic initiator initiates polymerization of an equimolar amount the additionally charged vinyl aromatic hydrocarbon monomer thereby creating "living" vinyl aromatic hydrocarbon polymers. Thus, the additional anionic initiator is added to create competition for the additional charge of vinyl aromatic hydrocarbon monomer resulting in the simultaneous production of (1) a terminal block of vinyl aromatic hydrocarbon monomer contributed units attached to the "living" block polymer precursor and (2) poly(vinyl aromatic hydrocarbon) having a living end. The resulting interpolymer is an interpolymerized blend of a block polymer and a poly(vinyl aromatic hydrocarbon) having living ends.

The reaction mixture is then treated to inactivate the living ends and recover the interpolymer product. While it is to be understood that any suitable treating method can be employed, one method for accomplishing the desired treatment comprises adding a catalyst-inactivating material. Exemplary catalyst-inactivating materials include water, alcohol, and organic acid, an inorganic acid, or the like. It is generally preferred to add only an amount of the catalyst-inactivating material sufficient to deactivate the catalyst without causing precipitation of the dissolved polymer. It has also been found to be advantageous to add an antioxidant to the polymer solution prior to isolation of the polymer. After the addition of the catalyst-inactivating material and the antioxidant, the polymer present in the solution can then be precipitated by the addition of an excess of the catalyst-inactivating material or isolated by flashing the solvent. Deactivation of the catalyst and precipitation of the polymer can be accomplished in a single step. The precipitated polymer can then be recovered by filtration, decantation, or the like. In order to purify the polymer, the separated polymer can be redissolved in a solvent, such as those suitable for the polymerization, and again precipitated by the addition of an alcohol. Thereafter, the polymer is again recovered by a suitable separation means, as indicated hereinbefore, and dried. The solvent and alcohol can be separated, for example, by fractional distillation, and recycled. The antioxidant can be added to the reaction mixture prior to precipitation of the polymer, to the solution of redissolved polymer, or to the solvent in which the polymer is to be subsequently redissolved. Polymerization can be carried out at any convenient temperature employed in the polymerization arts. Exemplary temperatures lie in the range of from less than about 0° to 200° C., or more, preferably polymerization temperatures range from 40° to 100° C., for each step. The pressures employed can be convenient, and preferably are pressures sufficient to maintain monomers and diluents substantially in the liquid phase. The polymerization times can vary widely as may be convenient, and will, of course, be affected by polymerization temperatures chosen. The times should be chosen, for each step, such that substantially complete polymerization is obtained.

Any anionic initiator that is known in the art as useful in the copolymerization of diene monomers with vinyl aromatic hydrocarbons can be employed in the process of the instant invention. Exemplary organo-lithium catalysts include lithium compounds having the formula R(Li)$_x$, wherein R represents a hydrocarbyl radical of 1 to 20, preferably 2 to 8, carbon atoms per R group and x is an integer from 1 to 4. Typical R groups include aliphatic radicals and cycloaliphatic radicals, such as alkyl, cycloalkyl, cycloalkylalkyl, alkylcycloalkyl, aryl and alkylaryl radicals. Specific examples of R group for substitution in the above formulas include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methylcyclopentylenthyl, cyclopentyl, dimethylcyclopentyl, ethylcyclopentyl, methylcyclohexyl, dimethylcyclohexyl, ethylcyclohexyl, isopropylcyclohexyl, and the like.

Specific example of other suitable lithium catalysts include: p-tolyllithium, 4-phenylbutyl-lithium, 4-butylcyclohexyllithium, 4-cyclohexylbutyl-lithium, lithium dialkyl amines, lithium dialkyl phosphines, lithium alkyl aryl phosphine, lithium diaryl phosphines and the like.

The preferred catalyst for use in the present invention is n-butyllithium and sec-butyllithium.

In accordance with the process of the present invention, two separate charges of anionic initiator must be made into the reaction zone. The first charge of anionic initiator is used to initiate polymerization of the monomer charges used to prepare the block polymer precursor of the present invention. The second charge of anionic initiator is added to the reaction zone containing the formed block polymer precursor in solution prior to or simultaneously with the final charge of vinyl aromatic monomer used to simultaneously prepare the terminal block onto the block polymer precursor and the interpolymerized poly(vinyl aromatic hydrocarbon). The amounts of anionic initiator employed in both: (1) the preparation of the block polymer precursor and (2) the preparation of the terminal block and interpolymerized poly(vinyl aromatic hydrocarbon) can vary over a broad range. In general, the first charge or amount of initiator used to initiate polymerization of the block polymer precursor will be in the range of from 0.1 to 5 milliequivalents of initiator per 100 parts by weight of total amount of monomer charged into the reaction zone and will preferably be in the range of from 0.4 to 2 milliequivalents of initiator per 100 parts weight of total monomer charged. Likewise, the amount of additional anionic initiator used to initiate polymerization of a portion of the final vinyl aromatic hydrocarbon monomer charge will be in the range of from 0.01 to 300 milliequivalents of initiator per 100 parts by weight of the monomers charged and will preferably be in the range of from 0.05 to 7.6 milliequivalents of initiator per 100 parts by weight of the monomer charged into the reaction zone. Variance of the amount of the second charge of the anionic initiator is used to control the amount of poly(vinyl aromatic hydrocarbon) interpolymerized with the block polymer.

A 1,2-microstructure controlling agent or randomizing modifier can be used during formation of the polymer blocks to control the 1,2-microstructure in the diene contributed units and to randomize the amount of vinyl aromatic monomers, such as styrene, incorporated with the diene monomer, such as butadiene, in the rubbery phase. Suitable modifiers include, but are not limited to, tetramethylenediamine (TMEDA), oligomeric oxolanyl propanes (OOPS), 2,2-bis-(4-methyl dioxane)(BMD), tetrahydrofuran (THF), bistetrahydrofuryl propane and the like. One or more randomizing, modifiers can be used. The amount of the modifier to the weight of the monomers in the reactor can vary from a minimum as low as 0 to a maximum as great as 400 millimoles, preferably 0.01 to 300.0 millimoles, of modifier per hundred grams of monomer currently charged into the reactor. As the modifier charge increases, the percentage of 1,23-microstructure increases in the diene monomer contributed units. A polar organic compound such a ether, polyether, tertiary amine, polyamine, thioether and hexamethylphosphortriamide may be used to control the vinyl linkage content in the conjugated diene component. The vinyl linkage content can be controlled by the amount added of the polar organic compound, and by the polymerization temperature.

Modifiers such a tetramethyl THF can be used to increase initiation of the first polystyrene block without effecting microstructure of the rubber block if low levels are used.

The process of this invention is preferably carried out in the presence of a hydrocarbon diluent. Aliphatic, aromatic hydrocarbons, paraffins, and cycloparaffins may be employed. The preferred hydrocarbons are those containing from 3 to 12, inclusive, carbon atoms, particularly n-hexane. Examples of diluents include propane, isobutene, n-pentane, isooctane, n-dodecane, cyclopentane, cyclohexane, methyl cyclohexane, benzene, toluene, xylene, and the like. Mixtures or two or more of these hydrocarbons may also be used.

The polymerization process may be conducted under batch or semi-batch conditions.

The polymers of this invention may be compounded further with other polymers, oils, fillers, reinforcements, antioxidants, stabilizers, fire retardants, tackifiers, vulcanization accelerators, vulcanizing agents, processing aids, antiblocking agents and other rubber plastic compounding ingredients without departing from the scope of this invention. These compounding ingredients are incorporated in suitable amounts depending upon the contemplated use of the product.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers.

The interpolymers of the instant invention can be used as is or can be incorporated into injection molding resins or in any other compositions typically containing high impact polymers. Particularly, the interpolymers of the present invention have improved processability over prior art blends of polystyrene and block polymers. The interpolymers produced according to the process of the present invention possess a Gardner Impact Strength of at least 60 ft-lb/inch, preferably at least 100 ft-lb/inch, more preferably at least 150 ft-lb/inch, and most preferably at least 200 ft-lb/inch.

The following examples are presented for purposes of illustration only and are not to be construed in a limiting sense. All percentages are by weight unless otherwise specified.

EXAMPLE 1

An interpolymer was produced according to the present invention. The structural characteristics of the triblock polymer produced by anionic polymerization are displayed in Table 1. The first block of this triblock polymer was prepared by charging a stirred reactor with (1) 18.2 lbs. of a 33% by weight charge of styrene in hexane, (2) 10.9 lbs. of hexane, (3) 0.69 kg of a 3% solution of n-butyllithium in hexane together with 1.634 grams of modifier, 10.0 kg of a 15% solution of a styrene/butadiene diblock dispersant. This mixture was heated at 120° F. for 30 minutes and then cooled to 110° F. to produce a first block as displayed in Table 1. A charge of 40.0 lbs. of a 33% by weight solution of 1,3-butadiene in hexane was added to the reactor as the temperature of the reactor was raised to 170° F. and heated until 30 minutes after peak temperature. The composition of the second block is disclosed in Table 1. The reactor was then additionally charged with 0.07 kg of a 3% solution of n-butyllithium in hexane followed by a charge of 134.8 lbs. of a 33% solution of styrene in hexane. The contents of the reactor was heated to 170° F. for 30 minutes after reaching the peak temperature. The reaction was terminated by adding 272.4 grams of a 3% aqueous solution of boric acid, and a 5.55 lbs of a hexane solution containing antioxidant was added. The molecular weight of the third block of the triblock polymer as displayed in Table 1 was 56,470. The molecular weight of the polystyrene produced in situ was also 56,470.

EXAMPLE 2

An interpolymer was produced according to the procedure of Example 1. The first block of this triblock polymer was prepared by charging a reactor with (1) 25.8 lbs. of a 33% by weight charge of styrene in hexane, (2) 33.6 lbs. of hexane, (3) 01 kg of a 3% solution of n-butyllithium in hexane together with 10 grams of modifier, 14.1 kg of a styrene/butadiene diblock dispersant. This mixture was heated at 120° F. for 30 minutes and then cooled to 100° F. to produce a first block as displayed in Table 1. Separate charges of 56.7 lbs. of a 33% by weight solutions of 1,3-butadiene in hexane and styrene in hexane were added to the reactor as the temperature of the reactor was raised to 170° F. and heated until 30 minutes after peak temperature. The reactor was then additionally charged with 0.16 kg of a 3% solution of n-butyllithium in hexane (20% of the initial catalyst charge) followed by a charge of 142.2 lbs. of a 33% solution of styrene in hexane. The contents of the reactor was heated to 170° F. for 30 minutes after reaching the peak temperature. The reaction was terminated by adding 11.57 grams of boric acid and 374 grams of water, followed by the addition of a 6.80 lbs. of a hexane solution containing antioxidant. As can be easily recognized from the results displayed in FIG. 1, all interpolymers produced according to the process of the present invention possess measured Gardner Impact Strengths exceeding 200 ft-lb/inch. The amount of crystal polystyrene incorporated in the interpolymer varied in amount ranging from 9.0% to 26.0%, by weight of the final styrene charge. The amount of in situ polystyrene present in the interpolymer did not adversely affect the Gardner Impact Strength (measured in ft-lb/inch) of the interpolymer, not did the interpolymer stick in the injection molder cavity.

TABLE 1

Physical Characteristics of the Triblock Polymer Produced According to the Instant Invention

| Example | First Block | | Second Block | | Third Block | | Total | Total |
|---|---|---|---|---|---|---|---|---|
| No. | MW[1] | % STY[2] | MW | % STY | MW | % STY | MW | % STY |
| 1 | 8,420 | 100 | 18,530 | 0 | 56,470 | 100 | 83,420 | 77.8 |
| 2 | 10,160 | 100 | 44,690 | 50 | 46,720 | 100 | 101,570 | 78.0 |

[1]Molecular Weight
[2]Percent Styrene Remainder Butadiene

COMPARATIVE EXAMPLE A

Figure 2:
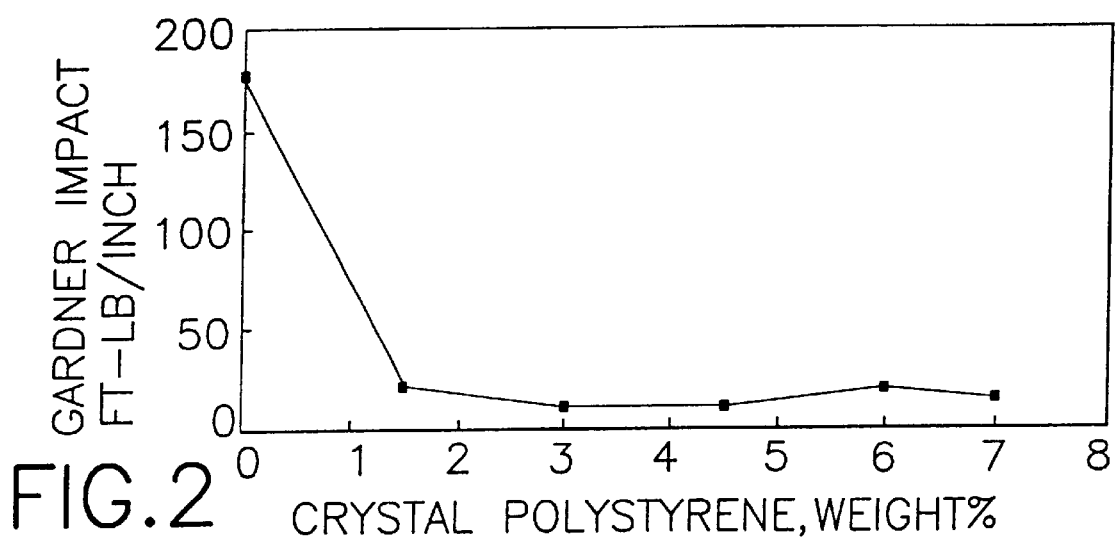
FIG. 2 illustrates the relationship between the Gardner Impact Strength (measured in ft-lb/inch) of a block polymer/ polystyrene blend and the amount by weight of crystal polystyrene added to the polymer as shown in Comparative Example A.

A triblock polymer was prepared by anionic polymerization techniques having the structural characteristics displayed in Table 2. The triblock polymer exhibited a Gardner Impact of about 175 ft-lb/inch, but the polymer adhered to the injection molder cavity. Crystal polystyrene was physically blended with the triblock polymer in amounts ranging from 1.5% to 7.0% by weight in order to improve the mold flow characteristics of the block polymer. The Gardner Impact Strength of the blend of triblock polymer of Table 2 and the crystalline polystyrene versus the percent by weight of crystalline polystyrene added to the triblock polymer is depicted in FIG. 2 in units of ft-lb/inch. The Gardner Impact Strength of the polymer blend was less than 25 ft-lb/inch upon the addition by blending of 1.5% by weight or more of the crystal polystyrene.

TABLE 2

Physical Characteristics of Block Polymer Utilized in Comparative Example A

| First Block | | Second Block | | Third Block | | Total | Total |
|---|---|---|---|---|---|---|---|
| MW[1] | % STY[2] | MW | % STY | MW | % STY | MW | % STY |
| 8,980 | 99 | 37,330 | 47.6 | 42,670 | 100 | 88,980 | 77.9 |

[1]Molecular Weight
[2]Percent Styrene Remainder Butadiene

COMPARATIVE EXAMPLE B

Figure 3:
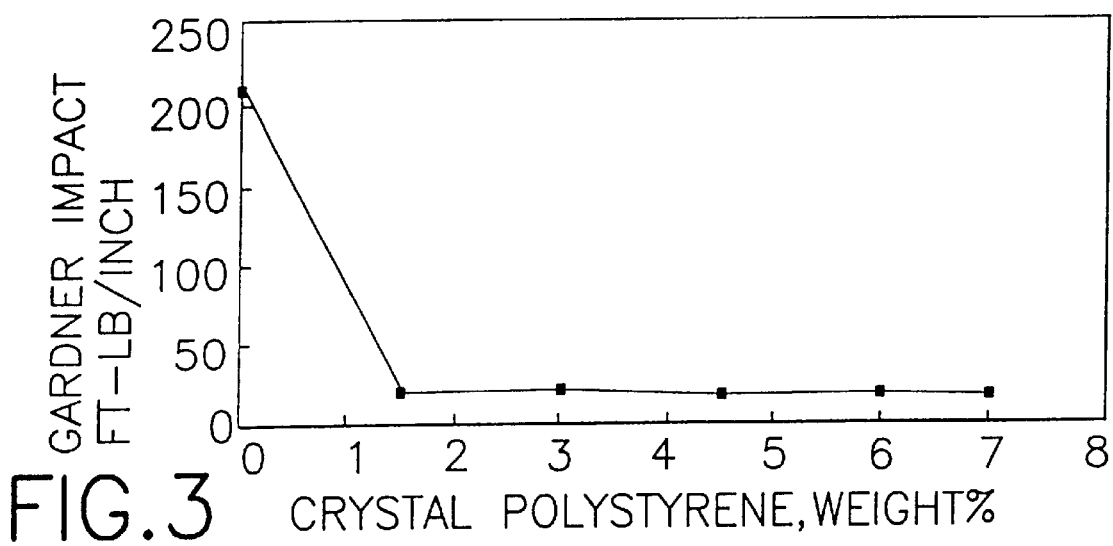
FIG. 3 illustrates the relationship between the Gardnew Impact Strength (measured in ft-lb/inch) of a block polymer/ polystyrene blend and the amount by weight of crystal polystyrene added to the polymer as shown in Comparative Example B.

A triblock polymer was prepared by anionic polymerization techniques having the structural characteristics displayed in Table 3. The block polymer exhibited a Gardner Impact of about 200 fl-lb/inch, but the polymer adhered to the injection molder cavity. Crystal polystyrene was physically blended with the block polymer in amounts ranging from 1.5% to 7.0% by weight in order to improve the mold flow characteristics of the triblock polymer. The Gardner Impact Strength of the triblock polymer decreased dramatically upon the addition by blending of 1.5% by weight or more of crystal polystyrene. The Gardner Impact Strengths of the polymer blends of Comparative Example B were about 20 ft-lb/inch and are displayed in FIG. 3 as measured in ft-lb/inch. The addition of polystyrene to the triblock polymer resulted in a loss of approximately 90% of the Gardner Impact Strength of the original triblock polymer.

TABLE 3

Physical Characteristics of Block Polymer Utilized in Comparative Example B

| First Block | | Second Block | | Third Block | | Total | Total |
|---|---|---|---|---|---|---|---|
| MW[1] | % STY[2] | MW | % STY | MW | % STY | MW | % STY |
| 8,620 | 99 | 37,540 | 50 | 39,250 | 100 | 85,410 | 77.9 |

[1]Molecular Weight
[2]Percent Styrene Remainder Butadiene

What is claimed is:

1. A blend comprising:
   an A—B—A block polymer, wherein the first A block is derived from a plurality of units of a vinyl aromatic monomer; the B block is derived from a plurality of units of a conjugated diene monomer; and the second A block is derived from a plurality of units of additional vinyl aromatic monomer which may be the same or different from the monomer of the first A block; and,
   a vinyl aromatic polymer derived from the same monomer as the second A block, wherein the molecular weight of the vinyl aromatic polymer and the molecular weight of the second A block derived from vinyl aromatic monomers are substantially the same and wherein said blend has a Gardner Impact strength of at least 60 ft-lb/inch.

2. The polymer blend according to claim 1 wherein the vinyl aromatic polymer is a homopolymer.

3. The polymer blend according to claim 1 wherein said vinyl aromatic monomer is styrene.

4. The polymer blend according to claim 1 wherein said A—B—A block polymer is a styrene-butadiene-styrene block polymer.

5. The polymer blend according to claim 1 wherein said A—B—A block polymer comprises a polystyrene block terminated block polymer.

6. The polymer blend according to claim 1 wherein said polymer blend has a Gardner Impact strength of at least 100 ft-lb/inch.

7. The polymer blend according to claim 1 wherein said polymer blend has a Gardner Impact strength of at least 150 ft-lb/inch.

8. The polymer blend according to claim 1 wherein said polymer blend has a Gardner Impact strength of at least 200 ft-lb/inch.

* * * * *